A. W. WALL.
MOTOR ATTACHMENT FOR VELOCIPEDES.
APPLICATION FILED JUNE 18, 1909.
1,044,608.
Patented Nov. 19, 1912.
3 SHEETS—SHEET 1.
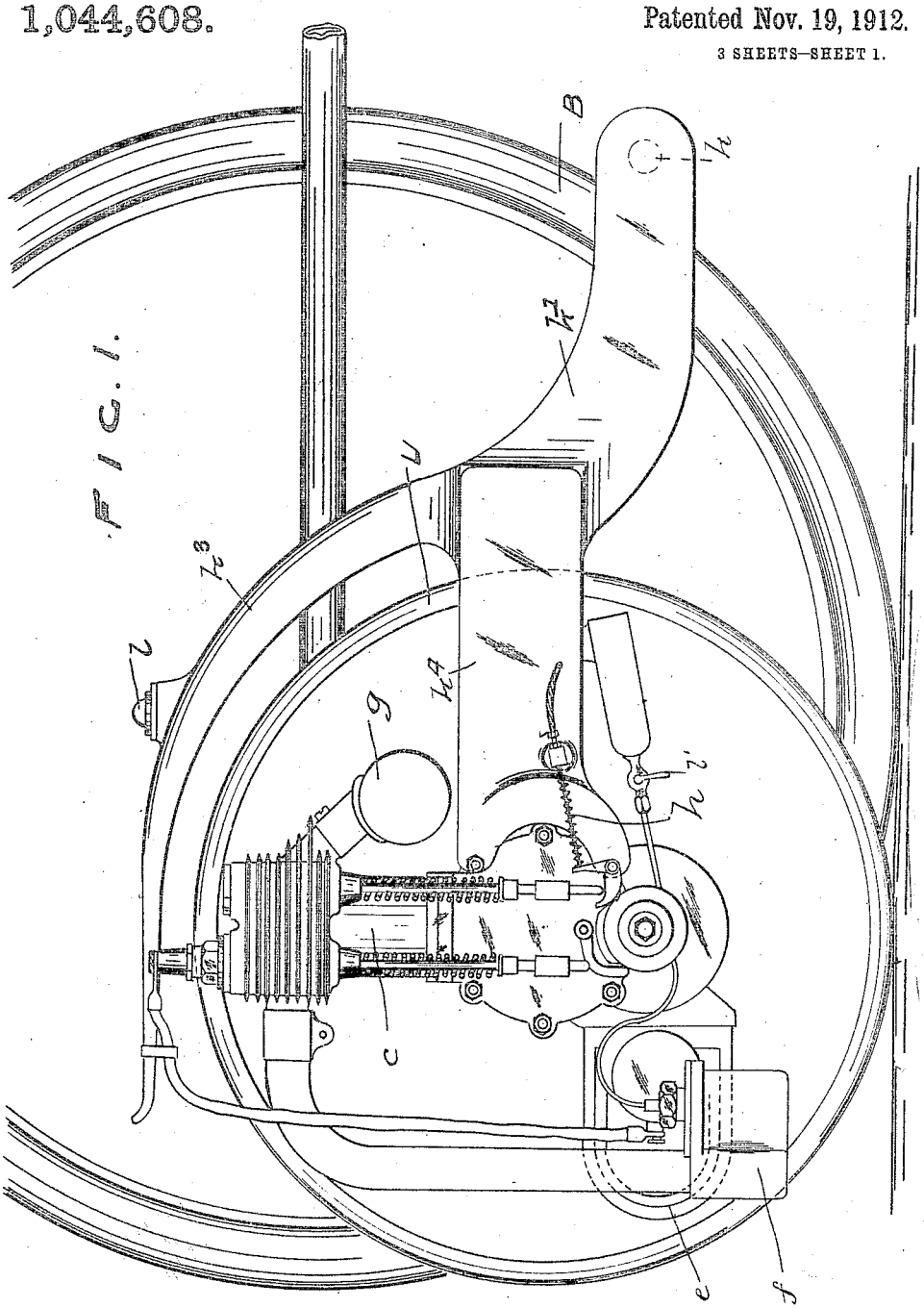

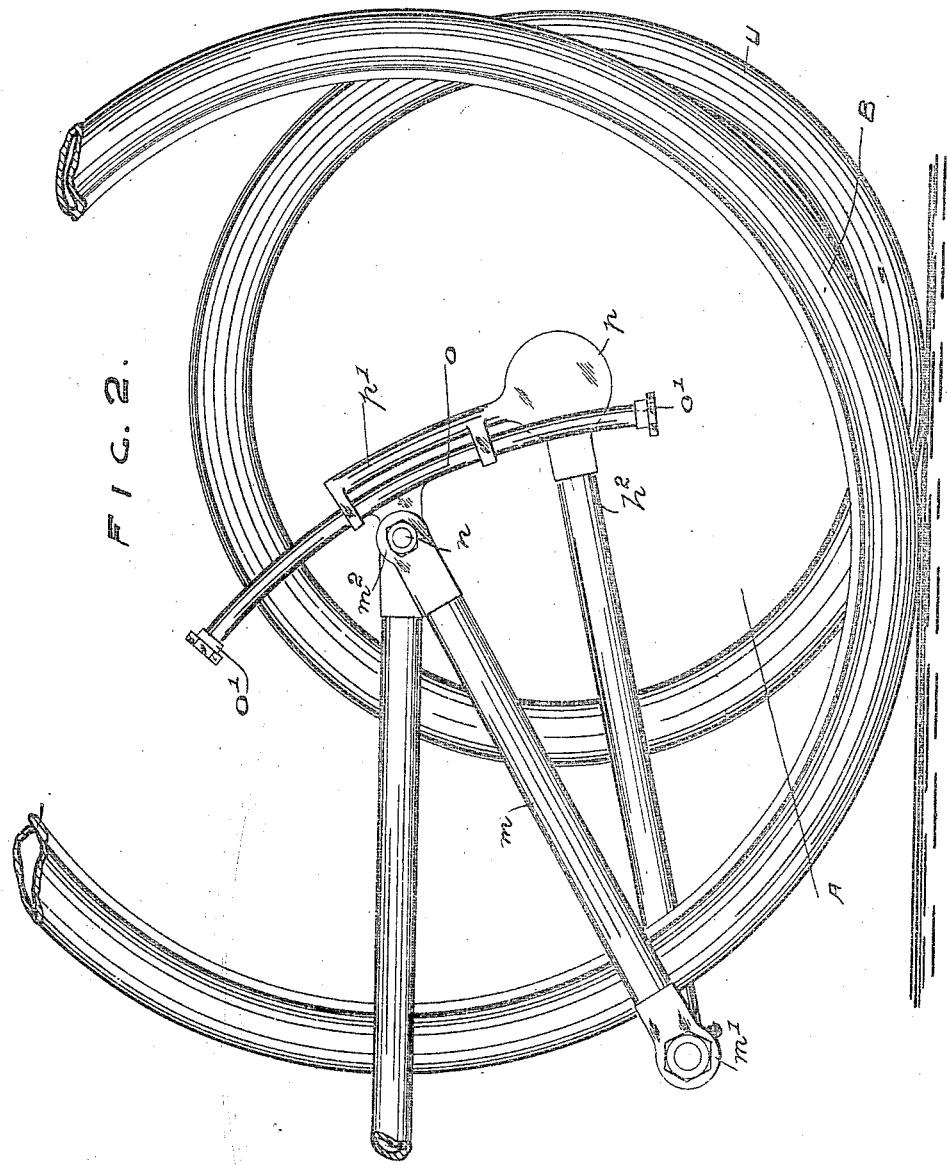

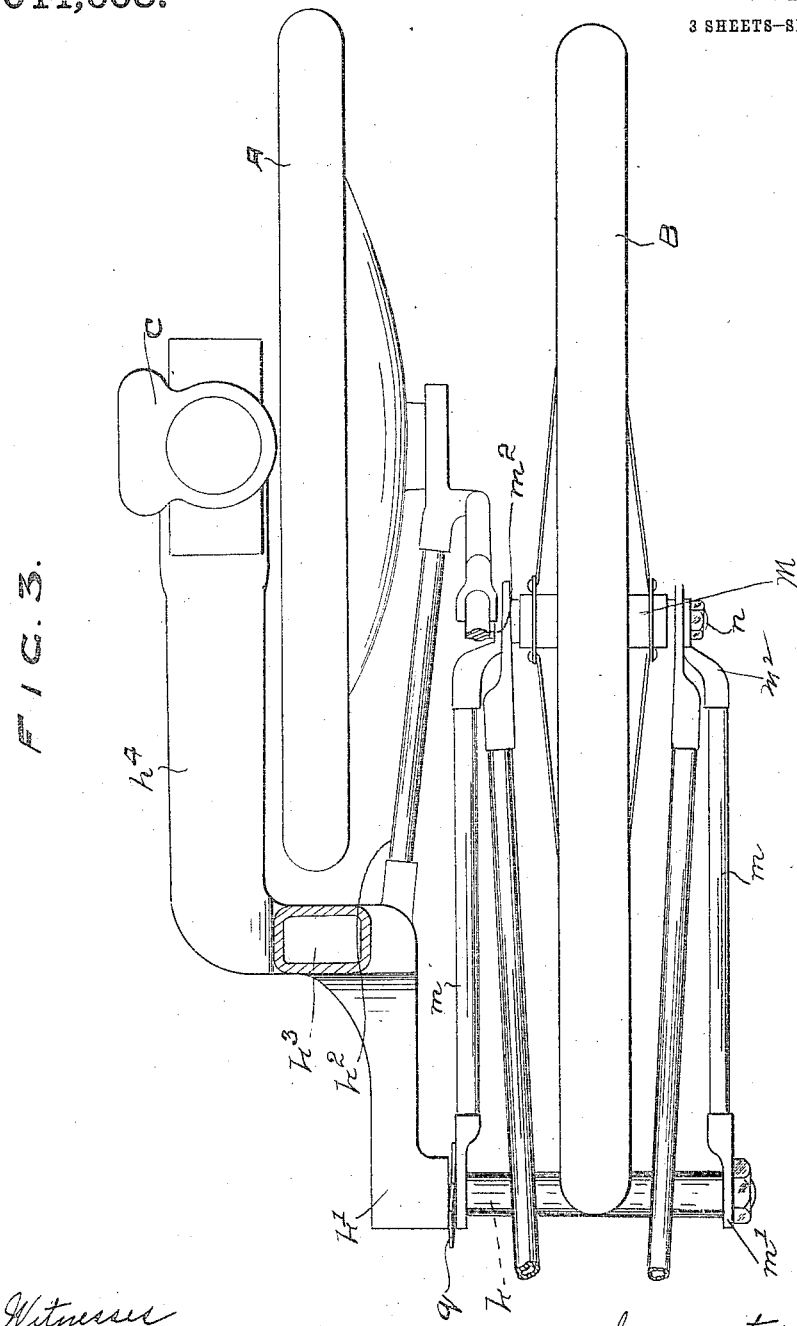

UNITED STATES PATENT OFFICE.

ARTHUR WILLIAM WALL, OF BIRMINGHAM, ENGLAND.

MOTOR ATTACHMENT FOR VELOCIPEDES.

1,044,608.

Specification of Letters Patent. Patented Nov. 19, 1912.

Application filed June 18, 1909. Serial No. 503,029.

*To all whom it may concern:*

Be it known that I, ARTHUR WILLIAM WALL, a subject of the Kingdom of Great Britain, residing at Roc Motor Works, Aston Road, Birmingham, in the county of Warwick, England, have invented certain new and useful Improvements in or Relating to Motor Attachments for Velocipedes, (for which I have applied for Letters Patent in Great Britain, Patent No. 23,080, dated October 30, 1908,) of which the following is a specification.

This invention relates to motor attachments for velocipedes, of the class wherein it is not desired that the motor should constitute the exclusive means of propulsion under all circumstances, but rather that the motor should assist the pedal-propulsion of the velocipede. Motor attachments of this class have been very much in demand but in the instances in which this class of apparatus has been carried into practice very little satisfaction has been attained in view of the necessity which exists for mounting the driving motor upon the velocipede frame, the cost of fitting and structural alteration incidental to such mounting being very little short of that of an ordinary lightweight motor bicycle.

The desirability of a practical self-contained motor attachment which may be manufactured in standardized quantities for indiscriminate fitting and which is of such a nature that it may be fitted to any existing bicycle in a few minutes and without the necessity for any previous alteration in adaptation of the bicycle is at once very evident, and it is with this desideratum in view that the present attachment has been devised, the latter being essentially different from any motor attachment at present in use.

According to the present invention a tractor having a motor driven auxiliary wheel is adapted for attachment as a third wheel to a bicycle in such a manner that during traction the steering and inclination characteristics of the bicycle are preserved. The steering characteristics of the bicycle may be preserved by arranging the auxiliary wheel as close as may be desirable at the side to the rear wheel of the bicycle; and the various inclinations which the bicycle is liable to assume during travel may then be provided for by enabling the auxiliary wheel to have a free up-and-down movement in relation to the road surface. The desired adaptation of the auxiliary wheel at the side of the main wheel in such a manner as to allow of the said up-and-down movement may conveniently be effected by means which insure that throughout all conditions of travel the auxiliary wheel is maintained in parallelism with the main wheel and by this arrangement the auxiliary and main wheels are allowed to remain in continuous contact with the ground under all circumstances as for instance when the bicycle is traversing an uneven surface or when the combination is negotiating a curve.

In order that this invention may be clearly understood and more easily carried into effect, reference may be had to the appended sheets of drawings, on which—

Figure 1 is a side elevation of the improved motor attachment applied to a velocipede. Fig. 2 is an elevation from the reverse side to that of Fig. 1 showing the means whereby the attachment is coupled to the velocipede. Fig. 3 is a plan of the coupling means shown in Fig. 2.

In an embodiment of this invention such as illustrated by the drawings the auxiliary driving element is provided with the independent road wheel A which is preferably of smaller diameter than the main road wheel B such independent road wheel A being driven by a light high speed motor C which is also mounted and suitably arranged upon the auxiliary element and supplied with fuel from a conveniently disposed tank.

In order to allow of a close relation of the auxiliary wheel with the wheel of the vehicle, the motor C and its appurtenances such as the magneto $e$ carbureter $f$ and silencer $g$ are advantageously arranged on the outer side of the auxiliary wheel A in which position they may be conveniently operated and regulated as by an exhaust lifter $h$ and other known control devices, their weight being substantially accommodated by the auxiliary wheel. Various means may be employed for accommodating or securing parallel relationship of the contiguous wheels under the varying road conditions. The bracket or device upon which the auxiliary wheel is mounted may be articulated to the frame in such a manner that the pivot of articulation is arranged parallel to the spindle of the main road wheel such an arrangement allowing of the entire device being displaced in a plane parallel with that of the main road wheel. Or the arm or limb which is carried by the auxiliary wheel is extended upwardly and adapted to slide vertically in or upon another member secured to the frame of the velocipede, in such a manner that the only movement such limb and the attendant auxiliary wheel can make is in a plane parallel to the velocipede wheel. I do not confine myself however to any specific means provided the desired object is attained. Preferably I employ the means illustrated in the drawings comprising the frame $k'$ which is advantageously extended in a forward direction for connection to the transverse pivot $k$, and which in conjunction with a stay $k^2$ efficiently supports the auxiliary wheel laterally while allowing it to perform its swiveling movement. A convenient disposition of the fuel is effected by making provision for its accommodation in the frame $k'$ which may be hollow at the parts $k^3$ $k^4$ and provided with suitable means $l$, $l'$ for filling and egress, while further space is economized by so locating and forming the portion $k^3$ as to constitute a guard for the protection of the rider from dust and mud. In some cases I may provide a simple fork in lieu of the frame $k^2$ and arrange the mudguard and fuel tank as separate fitments, while in all cases suitable means are provided for the lubrication of the engine. If desired provision may be made for protecting the mechanism from damage in the event of a fall.

The aforementioned transverse pivot $k$ is suitably attached to the frame of the velocipede for transmitting the thrust of propulsion and one method of effecting this purpose is shown in Figs. 2 and 3 in which dual struts $m$ are connected at one extremity $m'$ to the transverse pivot $k$ and at the other end $m^2$ to the rear axle of the velocipede. By forming the ends $m^2$ of a flat section, as shown, an extended spindle for attachment of the motor wheel is rendered unnecessary thereby permitting it to be indiscriminately coupled to all sizes and classes of velocipedes without alteration thereto. If desired a supplementary guide rod $o$ of suitable configuration and forming an extension of one of the struts $m$ may be incorporated, the inner bearing $p$ of the motor wheel being appropriately extended at $p'$ to slide on the rod $o$ while for preventing the motor wheel from leaving the guide when striking an obstruction stops $o'$ are incorporated. Excessive bouncing of the wheel may be obviated by introducing a frictional resistance between the relatively moving and fixed parts of the apparatus as for instance a spring washer $q$, as shown, in Fig. 3, such spring being adjustable and serving to assist in retaining the auxiliary wheel A in effective contact with the road.

The connection of the auxiliary driving element to the frame renders it incapable of preventing or impeding the sway or sidewise movement of the latter when in motion and such articulation or other connection has also the effect of efficiently absorbing the vibration of the auxiliary element thereby preventing the transmission of such vibration to the frame of the velocipede. The invention thus allows of a solid or cushioned tire or tread being used in conjunction with the motor driven wheel A, such tread in some cases being serrated or provided with means whereby it may more effectively grip the ground and thereby propel the vehicle.

In some cases provision may be made for locking the auxiliary wheel connection in order to render the machine self-supporting and thereby dispense with a stand, while the fork or frame of the auxiliary wheel may have the arm $k'$ jointed to the velocipede frame at or near the bottom bracket instead of to the back axle as aforedescribed. It is found in practice that the attachment materially assists in the prevention of skidding, while the mode of attachment enables it to be quickly fastened in position on or removed from the velocipede when required.

Having now described my invention I declare that what I claim is:—

1. A bicycle of the class wherein balance is maintained wholly by the rider, comprising in combination, a frame and a rear wheel therefor, a single motor wheel disposed alongside of and in extremely close proximity to said rear wheel, means carried by and rotatively driving the motor wheel and disposed wholly on that side thereof farthest from the rear wheel, and frame mechanism connecting the motor wheel with the bicycle for transmitting propulsive efforts from the former to the latter and maintaining the motor wheel in a line of travel parallel with the line of travel of the bicycle wheel, substantially as described.

2. A bicycle of the class wherein balance is maintained by the rider, comprising in combination, a frame and a rear wheel therefor, an auxiliary wheel, means carried by the auxiliary wheel for rotatively driving the same, and a frame mechanism for the auxiliary wheel pivotally connected with the bicycle at one point and slidably connected therewith at another point for transmitting propulsive efforts from the auxiliary wheel to the bicycle, substantially as described.

3. A bicycle of the class wherein balance is maintained wholly by the rider, comprising in combination, a frame and a rear wheel therefor, an auxiliary wheel alongside the rear wheel, means carried by the auxiliary wheel for rotatively driving the same and frame mechanism for the auxiliary wheel pivotally connected with the bicycle at one point to permit free vertical movement of said auxiliary wheel and slidably connected with the frame at points radial with said point for transmitting propulsive efforts from the auxiliary wheel to the bicycle, substantially as described.

4. A bicycle of the class wherein balance is maintained by the rider, comprising in combination, a frame and a rear wheel therefor, an auxiliary wheel disposed alongside of and in parallel relation with the rear wheel, means carried by the auxiliary wheel for rotatively driving the same, and frame mechanism for the auxiliary wheel for transmitting propulsive efforts therefrom to the bicycle, said frame mechanism being connected with the bicycle by a pivot disposed in advance of the rear wheel and in parallel relation with the axis of the rear wheel and maintaining said wheels in parallel relation, substantially as described.

5. A bicycle wherein balance is maintained wholly by the rider, comprising in combination, a frame and a rear wheel therefor, a single auxiliary driving wheel at one side of the rear wheel, a driving motor and rigid frame mechanism carried by the auxiliary wheel, and means movably connecting said auxiliary wheel frame to the bicycle frame and rigidly transmitting propulsive thrusts from the driving auxiliary wheel to the bicycle frame, said means causing the auxiliary wheel to always track parallel with the rear wheel and permitting up and down movement of the auxiliary wheel independently of the rear wheel, substantially as described.

In witness whereof I have hereunto set my hand in the presence of two witnesses.

ARTHUR WILLIAM WALL.

Witnesses:
 WALKER BARTLAM,
 ARTHUR BROWN.